(12) United States Patent
Brouwer et al.

(10) Patent No.: US 9,206,059 B2
(45) Date of Patent: Dec. 8, 2015

(54) PACKED BED BIOREACTOR FOR BIOFOULING CONTROL OF REVERSE OSMOSIS AND NANOFILTRATION MEMBRANES

(75) Inventors: Harry Brouwer, Wageningen (NL); Erich Wittmann, Draveil (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 13/393,936

(22) PCT Filed: Sep. 4, 2009

(86) PCT No.: PCT/EP2009/061456
§ 371 (c)(1),
(2), (4) Date: Apr. 17, 2012

(87) PCT Pub. No.: WO2011/026521
PCT Pub. Date: Mar. 10, 2011

(65) Prior Publication Data
US 2012/0193287 A1    Aug. 2, 2012

(30) Foreign Application Priority Data

Sep. 4, 2009  (WO) ............... PCT/EP2009/061456

(51) Int. Cl.
*B01D 61/02* (2006.01)
*B01D 61/14* (2006.01)
(Continued)

(52) U.S. Cl.
CPC .............. *C02F 1/441* (2013.01); *B01D 61/025* (2013.01); *B01D 61/027* (2013.01); *B01D 61/04* (2013.01);
(Continued)

(58) Field of Classification Search
CPC .......... C02F 1/441; C02F 1/442; C02F 3/006; C02F 3/10; C02F 3/1268; C02F 1/02; C02F 2209/001; C02F 2209/10; C02F 2209/40; B01D 61/025; B01D 61/027; B01D 61/04; B01D 61/145; B01D 61/147; B01D 65/08; B01D 2311/04; B01D 2321/04; Y02W 10/15
USPC .......................... 210/615, 618, 641, 650, 652
See application file for complete search history.

(56) References Cited

U.S. PATENT DOCUMENTS 5,403,487 A *  4/1995  Lodaya et al. ................ 210/610
7,046,063 B2 *  5/2006  Kuang et al. .................. 327/201
(Continued)

OTHER PUBLICATIONS

Hu et al, "Biofiltration pretreatment for reverse osmosis (RO) membrane in a water reclamation system," 2005, Center for Water Research, Department of Civil Engineering, National University of Singapore, Chemosphere 59 pp. 127-133.*

(Continued)

*Primary Examiner* — Nam Nguyen
*Assistant Examiner* — Claire Norris
(74) *Attorney, Agent, or Firm* — Coats and Bennett PLLC

(57) ABSTRACT

An installation and a method for removing dissolved biodegradable compounds as a biological treatment step upstream of an equipment to be protected from biofouling being part of a ground water, surface water or tertiary wastewater treatment line, wherein said upstream biological treatment step is carried out in at least one packed bed bioreactor comprising a vessel or a tank filled with packing elements, characterized in that: iv) said packing elements of said packed bed show a void fraction of at least 70% and the flow velocity of water through said packed bed bioreactor is at least 20 m/h, so that said packed bed does not have a removal efficiency of suspended solids in water, if any, of more than 30%; v) said packing elements of said packed bed show a specific surface area of at least 750 m2/m3; vi) said process does not require the use of any biocide or biostatic compound.

17 Claims, 15 Drawing Sheets

(51) Int. Cl.
    C02F 3/10        (2006.01)
    C02F 1/44        (2006.01)
    B01D 61/04       (2006.01)
    B01D 65/08       (2006.01)
    C02F 3/00        (2006.01)
    C02F 3/12        (2006.01)
    C02F 1/02        (2006.01)

(52) U.S. Cl.
    CPC ............ *B01D 61/145* (2013.01); *B01D 61/147* (2013.01); *B01D 65/08* (2013.01); *C02F 1/442* (2013.01); *C02F 3/006* (2013.01); *C02F 3/10* (2013.01); *C02F 3/1268* (2013.01); *B01D 2311/04* (2013.01); *B01D 2321/04* (2013.01); *C02F 1/02* (2013.01); *C02F 2209/001* (2013.01); *C02F 2209/10* (2013.01); *C02F 2209/40* (2013.01); *C02F 2303/20* (2013.01); *Y02W 10/15* (2015.05)

(56) References Cited

U.S. PATENT DOCUMENTS 7,082,893 B2 *   8/2006   Schreier et al. ............... 119/259
7,311,839 B2 * 12/2007   Schulze-Makuch et al. . 210/660
7,527,728 B2 *   5/2009   Jackson ........................ 210/150

OTHER PUBLICATIONS

Mendoza-Espinosa et al "A Review of Biological Aerated Filters (BAFs) for Wastewater Treatment" 1999, Environmental Engineering Science vol. 16, No. 3, pp. 201-216.*

Campos et al "Oilfield wastewater treatment by combined microfiltration and biological processes," 2002, Water Research 36 pp. 95-104.*

* cited by examiner

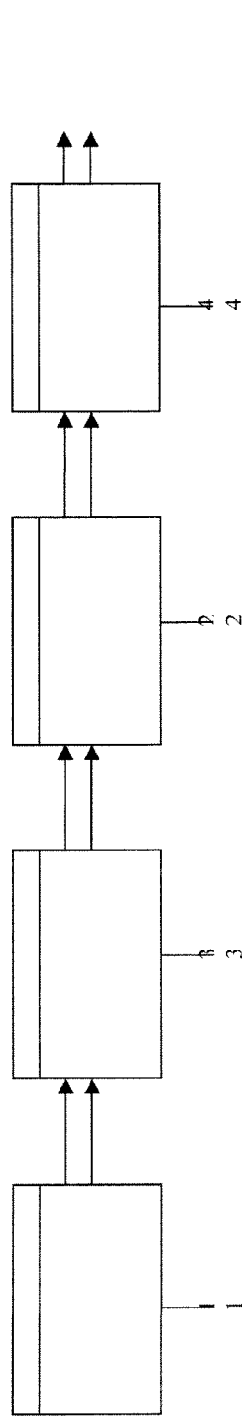
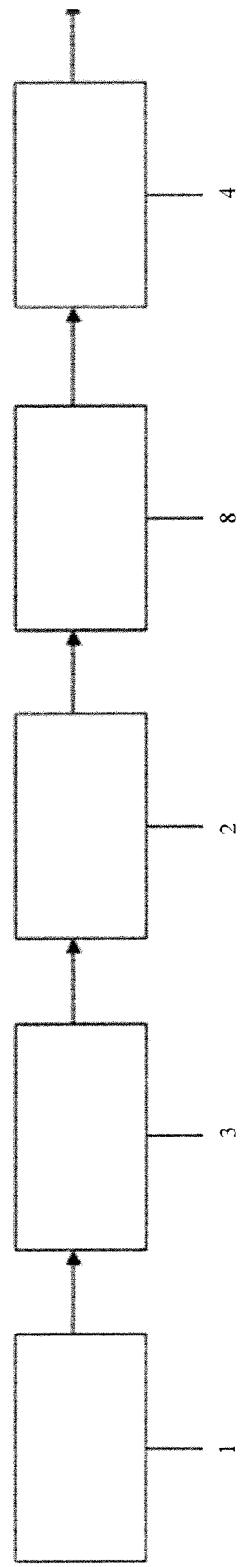
Fig. 2a
Fig. 2b

PACKED BED BIOREACTOR FOR BIOFOULING CONTROL OF REVERSE OSMOSIS AND NANOFILTRATION MEMBRANES

This application is a U.S. National Stage application of PCT No. PCT/EP2009/061456, with an international filing date of Sep. 4, 2009, and is incorporated herein by reference in its entirety.

FIELD OF INVENTION

The present invention relates to a method for biofouling control of reverse osmosis and nanofiltration membranes by removal of dissolved biodegradable compounds using a packed bed bioreactor.

BACKGROUND

Membrane separation technologies are more and more used in water treatment for the production of water for human consumption and for use in industry. Major membrane processes in water treatment are microfiltration (MF), ultrafiltration (UF), nanofiltration (NF) and reverse osmosis (RO). Microfiltration and ultrafiltration are filtration processes characterized by extremely high removal rates of solid material (particulate and colloidal matter) present in the water, whereas nanofiltration and reverse osmosis allow the removal of compounds that are dissolved in the water.

Compared to conventional water treatment processes, membranes offer several advantages, especially a better and constant quality of the treated water.

A major challenge for the implementation of membrane processes is the control of fouling of the membranes. Common types of membrane fouling are:
- fouling by particles and colloids that deposit on the membrane surface
- scaling, i.e. precipitation of sparingly soluble salts
- organic fouling, i.e. adsorption of organic compounds on the membrane surface
- biofouling, i.e. excessive growth of a biofilm at the membrane surface In reverse osmosis and nanofiltration, most commonly the separative layer of the membrane is made of a polyamide with a very limited resistance to oxidants like chlorine. Today the module type generally used in reverse osmosis and nanofiltration units is the so-called spiral wound module. A second type of commonly used reverse osmosis and nanofiltration membranes is hollow fibers.

Among the different types of fouling observed on plants using such polyamide reverse osmosis or nanofiltration membranes, biofouling is the most frequent one. Membrane biofouling causes increased energy consumptions due to increased pressure requirements. A further concern is the increase in required membrane frequency resulting in production losses due to increased downtime and in reduced membrane life. Also very high pressure losses across the modules (between feed and concentrate) may cause mechanical damage of the module. In all cases the consequence of biofouling is an increase in costs per amount of produced or treated water.

DESCRIPTION OF THE PRIOR ART

Control of biofouling of reverse osmosis and nanofiltration membranes is generally achieved by one of the following methods or a combination of them. One method is the use of biocides or biostatic agents that are compatible with the membranes, for example non-oxidizing biocides or monochloramine that is injected continuously or used as shock treatment. Another method is the use of spiral wound modules with thick feed spacers which reduces the head loss between feed and brine. Other common methods are the use of biofilm attachment prevention techniques, such as for example a modified membrane surface or high water velocity in the membrane module, or the disinfection of the feed water to the membranes via for example chlorination and then subsequent dechlorination upstream of the membranes. Another method is the frequent chemical cleaning of the membranes.

All the above methods have limitations or shortcomings such as environmental impact, costs or limited efficiency. In recent years another method consisting of a biological treatment upstream the RO or NF membranes is more and more applied. This method allows the removal of dissolved biodegradable compounds that are thus no longer available for the biofilm on the membrane. As a result, biofouling is avoided or at least reduced significantly. All processes for control of biofouling of reverse osmosis and nanofiltration membranes based on nutrient removal, which can be found in literature, combine filtration with biological treatment. These processes are biofiltration on sand filters, dual media filters, multimedia filters and granular activated carbon filters as well as membrane bioreactors.

For avoiding fouling of reverse osmosis and nanofiltration membranes by particulate matter and colloids, the best available technology is a pre-treatment by microfiltration or ultrafiltration membranes. However many plants have been built using this approach, having little or no removal of dissolved nutrients in the pre-treatment and thus suffer from biofouling on the reverse osmosis or nanofiltration membranes.

In Flemming et al. an approach for prevention of biofouling of membranes based on the optimization of nutrient limitation techniques is disclosed (H.-C. Flemming et al., *Desalination*, 113 (1997) 215-225). The use of biofilms in the right place to minimize biofilm forming at sites where they are not wanted, i.e. allowing controlled biofilm formation is suggested. Offering a surface-rich area ahead of the system to be protected against biofouling is suggested so that biofilms can form on such area and consume degradable matter from the water stream decreasing the extent of biofilm development in subsequent compartments. The biofilter used in the disclosed experiments of Flemming et al is a sand filter. For sanitizing the use of biocides or the removal of the biofilm to overcome the problem of the hydrodynamic resistance caused by the biofilm are disclosed. This publication does not give details on how to form such surface rich area and how the system should be run to optimize the biofilm formation and depletion of nutrients for preventing biofouling of downstream equipment.

In Brouwer et al. the use of a biofilter DeNutritor® upstream of a reverse osmosis system is disclosed. It could be shown that pre-treatment of feed water with DeNutritor® reduces the biofouling rate on membranes (H. Brouwer et al., *Desalination*, Volume 11, Issues 1-3, 20 Nov. 2006, Pages 15-17). However, DeNutritor has its limitations when handling high solids loads. The technology requires adequate pretreatment in order to operate satisfactory. Adequate pretreatment, with membrane filtration as a minimum to remove suspended solids, increases the overall investment and operation costs of the technology.

A further disadvantage of DeNutritor® is that In-line regeneration of the proposed concept is not possible due to the type of foam like carrier material used. Once an unacceptable pressure drop over the biofilter is reached the foam needs to be replaced or to be serviced, while production is out of operation. This practically means that 100% redundancy of the biofilter is required for continuous operation.

Furthermore the foam doesn't have any protected surface area. Basically this means that regeneration of the foam cannot be controlled with the aim to remain a certain level of bioactivity in the biofilter.

WO01/72645 discloses a system with two treatment stages before a reverse osmosis device, namely a bioreaction stage and a conditioning stage where a biostatic agent is added to the water. The problem solved by this application is the prevention of biofouling of the downstream membrane through these two synergistically acting stages. In principle, the carrier material in the bioreaction stage can be made of different materials, such as gravel, activated carbon, or plastic pellets with specifically large surface for the bioresorption process. Preferred is a multimedia filter. In this first stage a substantial portion of the TOC is reacted microbially. This invention focuses especially on the advantages of the second stage, i.e. the addition of a biostatic and the effect of the combination of both stages. It is claimed that 80-90% of the biologically degradable TOC present in the raw water can be removed. However, as the method includes the injection of a biostatic agent, one can conclude that the nutrient removal by the biofiltration used by the inventors of WO01/72645 alone is insufficient for biofouling control. Furthermore, the use of a biostatic agent can be costly, is potentially not sustainable and can represent an obstacle for the application of this method for drinking water treatment.

WO01/72645 discloses the implementation of a filtration in the bioreaction step. However, the advantages of a bioreactor without (integrated) filtration are not disclosed in WO01/72645.

SUMMARY OF THE INVENTION

The present invention relates to a method for removing dissolved biodegradable compounds as a biological treatment step upstream of an equipment to be protected from biofouling being part of a ground water, surface water or tertiary wastewater treatment line, wherein said upstream biological treatment step is carried out in at least one packed bed bioreactor comprising a vessel or tank filled with packing elements.

The purpose of the removal of dissolved biodegradable compounds is the protection of downstream equipments from biofouling. The water to be treated can be ground water, surface water (river, lake, reservoir, sea, etc.) or tertiary waste water.

The present invention is characterized in that packing elements of said packed bed show a void fraction of at least 70% and in that the flow velocity of water through said packed bed bioreactor is at least 20 m/h, and preferably comprised between 20 m/h and 400 m/h, so that said packed bed does not have a removal efficiency of suspended solids in water, if any, of more than 30%. The present invention is furthermore characterized in that said packing elements of said packed bed show a specific surface area of at least 750 $m^2/m^3$ and in that said process does not require the use of any biocide or biostatic compound for efficient performance.

An advantage of this biological treatment process, compared to biofilters and membrane bioreactors, is among others a simpler design of the equipment and an easier operation resulting in lower costs.

In a preferred embodiment the elements of said packing bed show a protected surface area of at least 350 $m□/m^3$.

In a further embodiment of present invention the biological treatment step is combined with a filtration step. This filtration step can be a conventional filtration step, an ultrafiltration or a microfiltration step and can be carried out either downstream or upstream of the packed bed bioreactor.

In another embodiment the treatment line further includes at least one nanofiltration or reverse osmosis membrane.

In a more preferred embodiment the filtration step is carried out downstream of the packed bed bioreactor and upstream of said reverse osmosis or nanofiltration membrane.

In one embodiment of present invention the downstream equipment to be protected from biofouling is a drinking water distribution network.

In another embodiment the treatment line includes a heat exchanger. In this embodiment the solid content of the raw water is low enough so that the biological treatment process of the present invention can be used in a standalone configuration upstream the equipment to be protected from biofouling.

In one preferred embodiment said degradation of the biodegradable compounds in the bioreactor takes place without aeration of the bioreactor.

The present invention furthermore provides a system for removing dissolved biodegradable compounds as a biological treatment step upstream of an equipment to be protected from biofouling being part of a ground water, surface water or tertiary wastewater treatment line comprising at least one packed bed bioreactor comprising a vessel or a tank filled with packing elements and at least one means for pumping the feed water into the packed bed bioreactor. The present invention is characterized in that packing elements of said packed bed show a void fraction of at least 70% and in that said means for pumping the feed water into the packed bed bioreactor control the flow velocity of water through said packed bed bioreactor to at least 20 m/h, and preferably to between 20 m/h and 400 m/h, so that said packed bed does not have a removal efficiency of suspended solids in water, if any, of more than 30%. The present embodiment is furthermore characterized in that said packing elements of said packed bed show a specific surface area of at least 750 $m□/m^3$. This embodiment is further characterized in that it comprises at least one filtration device upstream of the at least one packed bed bioreactor.

In one embodiment of present invention said upstream filtration device is a membrane filtration device, preferably an ultra filtration or micro filtration device.

In another embodiment said upstream filtration device is a conventional filtration device.

In one preferred embodiment the system further comprises a reverse osmosis or nanofiltration membrane downstream of the packed bed bioreactor.

In another preferred embodiment the packed bed bioreactor further comprises an inlet distributor allowing even distribution of the feed water in axial direction from the top of the vessel.

FIGURES

FIG. 2a shows another preferred embodiment of present invention, wherein the packed bed bioreactor is downstream the membrane filtration step.

FIG. 2b shows another alternative embodiment of present invention, wherein a cartridge filter is placed between the packed bed bioreactor and the RO membrane.

DETAILED DESCRIPTION OF THE INVENTION

Figure 1:
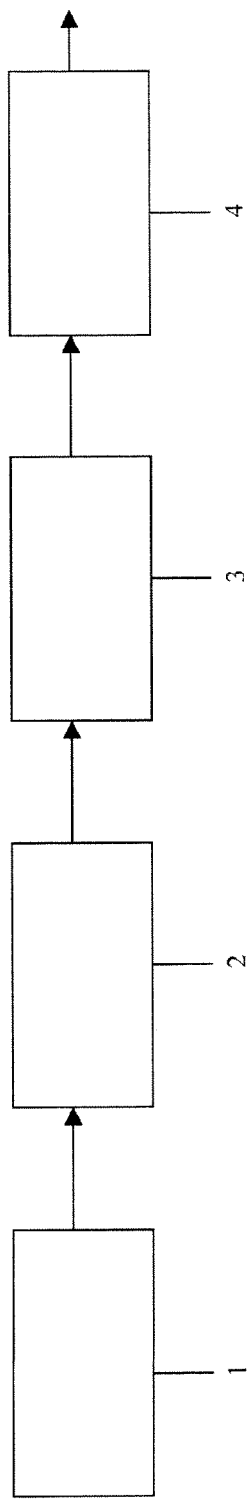
FIG. 1 shows one preferred embodiment of present invention, wherein the packed bed bioreactor is upstream the membrane filtration step.

The present invention relates to a method for removing dissolved biodegradable compounds as an upstream biological treatment step as part of a ground water, surface water or tertiary wastewater treatment line. The upstream biological treatment step is carried out in at least one packed bed bioreactor comprising a vessel or tank filled with packing elements.

The purpose of the removal of dissolved biodegradable compounds is the protection of downstream equipments from biofouling. The water to be treated can be ground water, surface water (river, lake, reservoir, sea, etc.) or tertiary waste water.

The present invention is characterized in that packing elements of said packed bed show a void fraction of at least 70% and in that the flow velocity of water through said packed bed bioreactor is at least 20 m/h, and preferably comprised between 20 m/h and 400 m/h, so that said packing bed does not have a removal rate of suspended solids in water, if any, of more than 30%. At this flow velocity the transfer of nutrients into the biofilm is enhanced and the thin active biofilm layer maintained.

The present invention is furthermore characterized in that said packing elements of said packed bed show a specific surface area of at least 750 m²/m³. In a preferred embodiment said elements of said packing bed show a protected surface area of at least 350 m²/m³. The specific surface area according to present invention can be either loose or structured. The specific surface area of present invention offers competing growth surface area where micro-organisms will have the ability to settle and grow. The microorganisms form a biofilm on the specific surface area and deplete the nutrients available in the feed stream of water flowing through the packed bed bioreactor. This results in lack of nutrients and therewith lack of growth of microorganisms at the downstream membrane system. One major advantage of present invention is thus the controlled growth of microorganisms at a specific area upstream of the membranes to be protected from biofouling.

The present invention is furthermore characterized in that said process does not require using any biocide or biostatic compound. One major disadvantage of the use of biocides, such as for example oxidizing agents like chlorine or hydrogen peroxide, is that the downstream membrane in most applications has to be protected from such biocides. Another step for removal of the biocide therefore has to be added before the feed water reaches the membrane stage. Non-oxidizing biocides that do not harm the downstream membrane can be used, but will have to be removed from the resulting waste stream at the membrane stage. Biostatics can be added in low amounts in order to inhibit further growth of microorganisms and do generally not inhibit the functioning of the downstream membrane stage.

In one embodiment of present invention the packing elements of this invention can be made of metal, ceramic or plastic, in a preferred embodiment said packing material is made of high density polyethylene. The density can be increased by use of a master batch of elements containing for example $TiO_2$ or $CaCO_3$. For most applications the packing elements exist in two densities, for example 0.95 kg/dm³ and 0.98 kg/dm³. The density tolerance is +/−0.02 kg/dm³. In one preferred embodiment of present invention the packing element is AnoxKaldnes® K1.

Figure 14:
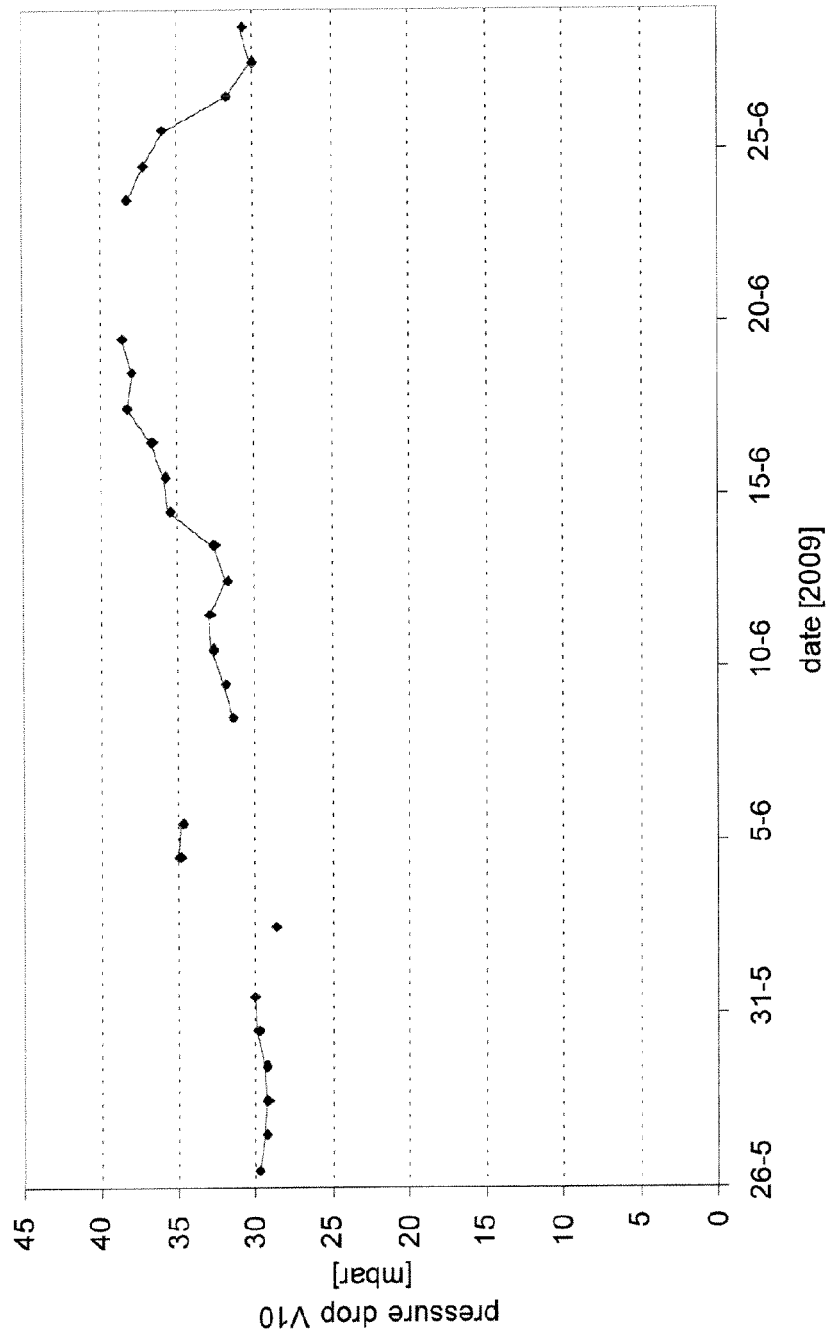
FIG. 14 shows the pressure difference at inlet and outlet of bioreactor V10.

The bioreactor of present invention has neither intended nor strong filtering characteristics (example 2 and FIG. 14).

The bioreactor of present invention comprises a vessel or a tank filled with packing elements.

In one embodiment of present invention the vessel or tank of present invention is closed. No gas phase is present in the vessel or tank of the bioreactor, i.e. the packing elements in the vessel or tank are completely flooded. In this embodiment aeration is not necessary as the water to be treated in said embodiment only has a relatively limited content of nutrients and the dissolved oxygen concentration entering the bioreactor is generally sufficient for efficient biodegradation of the nutrients.

One of the advantages of present invention is that even in case of anoxic or anaerobic conditions the absence of aeration does not represent any inconvenience as long as the water is prevented from any oxygen uptake between the bioreactor and the equipment to be protected from biofouling, because the potential anoxic or anaerobic biofouling on the membranes is also prevented by an anoxic or anaerobic biogrowth in the packed bed bioreactor.

Microfiltration and ultrafiltration are the best available technologies for the removal of suspended solids (particulate and colloidal matter). Their efficiency in solids removal is significantly better than that of conventional granular media filtration. However these membranes do not remove any dissolved compounds, including the dissolved nutrients responsible for biofouling of the reverse osmosis or nanofiltration membranes. The latter shortcoming is overcome by the combination of this membrane filtration technology with the packed bed bioreactor of the present invention.

The advantage of the packed bed bioreactor compared to conventional biofilters is its simpler design and reduced reactor volume resulting in reduced investment costs as well as its simplified operation through reduced head loss and very low or nil backwash frequency resulting in reduced operation costs. The reason for the lower required reactor volume is a higher fixed biomass concentration that can be explained by a high specific surface area of the packing material and an increased thickness of the biofilm. Further advantages are that the packed bed bioreactor can be, if required, regenerated in-line, that the bioreactor will contain essentially sufficient bioactivity after regeneration due to the protected surface area, and that the bioreactor therefore does not require any redundancy.

In the preferred embodiments as shown in FIGS. 1 and 2a the packed bed bioreactor 2 is combined with a membrane filtration step 3 utilizing microfiltration or preferentially ultrafiltration membranes. The aim of this combination of two treatment steps is to avoid fouling by particles and colloids as well as to control biofouling of membranes in a downstream reverse osmosis or nanofiltration step 4.

In the preferred embodiment according to FIG. 1 the packed bed bioreactor is upstream the membrane filtration step, whereas it is downstream of the membrane filtration step in the preferred embodiment according to FIG. 2a.

According to FIG. 1, feed water 1 is fed into a packed bed bioreactor 2 according to present invention. The water that exits the packed bed reactor 2 then flows into a membrane filtration step 3 before reaching the reverse osmosis or nanofiltration step 4. According to FIG. 2a the feed water 1 is first fed into a membrane filtration step 3 before entering the packed bed bioreactor 2 according to present invention, and then reaching the reverse osmosis or nanofiltration step 4.

Compared to a membrane bioreactor, the two preferred embodiments of the present invention according to FIGS. 1 and 2a have mainly two advantages. The reduced solid load on the UF or MF membranes, i.e. the suspended biomass present in membrane bioreactors versus the fixed biofilm in the packed bed bioreactor, has a positive impact on the design flow rate and/or the cleaning frequency of the UF or MF membranes. Furthermore pressurized type UF or MF membranes can be used in this application whereas in general submerged membranes are used for membrane bioreactors. Such submerged membranes have several shortcomings, such as for example their higher price, the more difficult maintenance (cleaning), the necessity for degassing of the permeate, thus requiring additional gas removal equipment, etc.

The advantage of the preferred embodiment according to FIG. 1 is the removal of biomass that may detach from the biofilm on the packing material of the bioreactor by the membrane filtration step. This detached biomass potentially may in some case cause some fouling of the reverse osmosis or nanofiltration membranes if not removed.

The back flush frequency can be decreased in this embodiment, as there is no risk of detached biomass reaching the reverse osmosis or nanofiltration membranes.

The advantage of the preferred embodiment according to FIG. 2a is the absence of suspended matter in the feed water 1 to the packed bed bioreactor 2. Even at a very low removal rate, the suspended matter potentially captured by the biofilm in the configuration of the preferred embodiment according to FIG. 1 may contribute to the increase of the head loss of the bioreactor and thus may have an impact on its cleaning frequency. A further advantage of the embodiment according to FIG. 2a is that no additional feed pump for feeding the water into the bioreactor is required when an ultrafiltration device is located upstream of the packed bed bioreactor as the pump of the ultrafiltration device provides for a feed stream according to the requirements for the functioning of the packed bed bioreactor.

In another alternative embodiment of the embodiment as shown in FIG. 2b a cartridge filter 8 is placed between the packed bed bioreactor 2 and the reverse osmosis or nanofiltration membrane 4 to entrap any biosolids that might detach from the bioreactor and reach the reverse osmosis or nanofiltration membrane 4.

Figure 3:
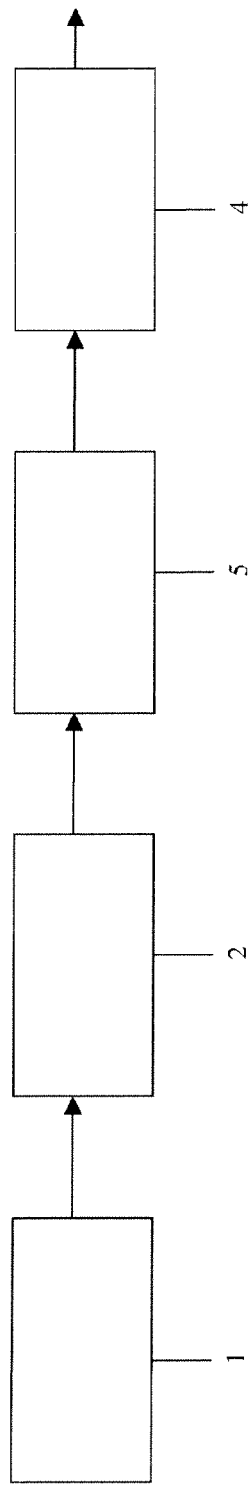
FIG. 3 shows a further embodiment of present invention, wherein the packed bed bioreactor is upstream of a conventional filtration step.
Figure 4:
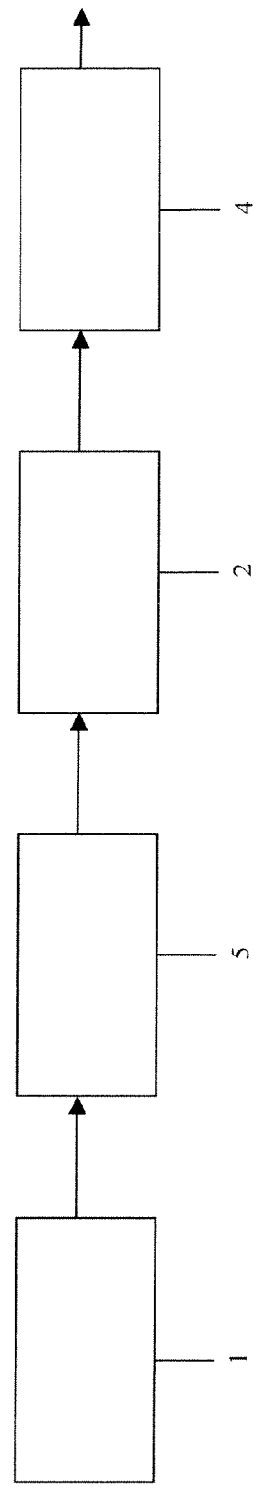
FIG. 4 shows an embodiment of present invention, wherein the packed bed bioreactor is situated downstream of a conventional filtration step.

Another preferred embodiment of present invention comprises a conventional filtration step instead of the membrane filtration step. In the preferred embodiment as shown in FIG. 3, the packed bed bioreactor 2 is upstream of a conventional filtration step 5, whereas in the preferred embodiment as shown in FIG. 4, the packed bed bioreactor 2 is situated downstream a conventional filtration step 5.

The conventional filtration step 5 can be any type of filter other than membranes, for example a granular media filter with inert or/and adsorbent filter media, a screen or microscreen filter, a fiber bundle type filter or a disc type filter. In case of such a conventional filtration, some biological activity is present but possibly can, like in the case of membrane filtration, be insufficient for a reasonable control of biofouling of the downstream reverse osmosis or nanofiltration membranes 4. In this case a supplementary packed bed bioreactor 2 enhances the biodegradation of the available nutrients, and thus boosts the biofouling control of the reverse osmosis or nanofiltration membranes 4.

The main reason for using alternative filters above UF/MF is lower costs. UF/MF have excellent performance of solids removal which is a prerequisite for endurable operation of RO membranes of the spiral wound type. However the barrier for suspended solids does not have to be 100% (as it is the case with UF/MF). This allows alternative filtration technologies that are lower in cost. In combination with the packed bioreactor according to present invention conventional filtration technologies can offer a cost effective alternative for UF/MF.

Figure 5:
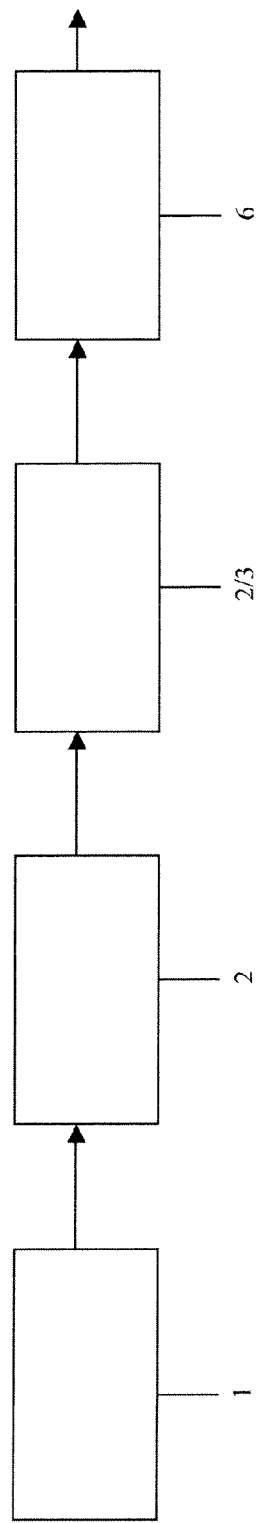
FIG. 5 shows another preferred embodiment of present invention, wherein the packed bed bioreactor 2 is situated upstream of a filtration step before the water distribution network.

Another preferred embodiment relates to the process of using a packed bed bioreactor 2 for the reduction of biofilm formation in water distribution networks and especially in drinking water distribution networks 6. As some biofilm can detach from the packed bed bioreactor 2, it is preferable that in this case the packed bed bioreactor 2 is situated upstream the last filtration step in the water treatment line as shown in FIG. 5. A reduced amount of nutrients available reduces the disinfectant dose rate required for efficient disinfection of the whole distribution network 6.

Figure 6:
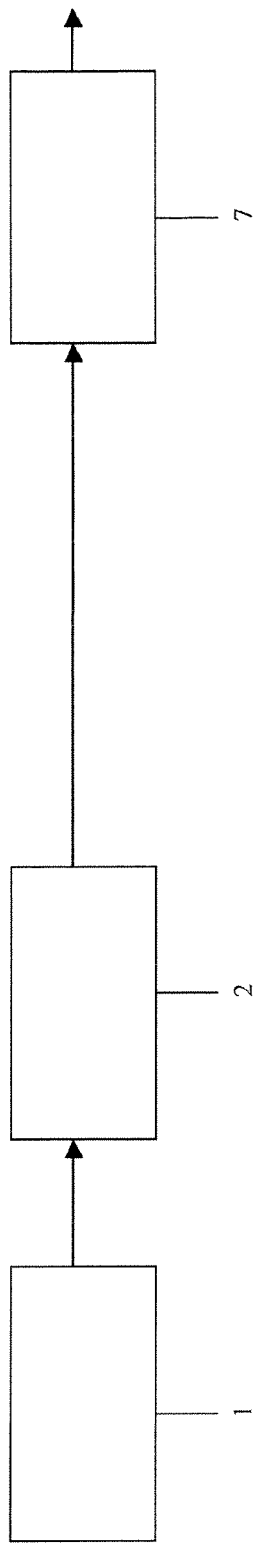
FIG. 6 shows another preferred embodiment of present invention, wherein the packed bed bioreactor is situated directly upstream of a heat exchanger without an additional filtration step.

A further preferred embodiment as shown in FIG. 6 relates to the use of a packed bed bioreactor 2 for the biofouling control of downstream equipments without an additional filtration step. This method is suitable when for example the water to be treated has low suspended matter content, or the downstream equipment that is to be protected from biofouling has a low sensitivity to the presence of suspended solids. The equipment that is to be protected from biofouling in this preferred embodiment can for example be a heat exchanger 7 as disclosed in FIG. 6.

The present invention furthermore discloses a system for removing dissolved biodegradable compounds as a biological treatment step upstream of an equipment to be protected from biofouling being part of a ground water, surface water or tertiary wastewater treatment line comprising at least one packed bed bioreactor comprising a vessel or tank filled with packing elements and at least one means for pumping the feed water into the packed bed bioreactor.

The present invention is characterized in that said packing elements of said packed bed show a void fraction of at least 70% and in that said means for pumping the feed water into the packed bed bioreactor control the flow velocity of water through said packed bed bioreactor to at least 20 m/h, and preferably to between 20 m/h and 400 m/h, so that said packing bed does not have a removal efficiency of suspended solids, if any, in water of more than 30%. The present embodiment is furthermore characterized in that said packing elements of said packed bed show a specific surface area of at least 750 m²/m³. In a preferred embodiment said elements of said packing bed show a protected surface area of at least 350 m²/m³. The present embodiment is further characterized in that it comprises at least one filtration device upstream of the at least one packed bed bioreactor. The advantage of this system according to present invention is that the filtration device upstream of the packed bed bioreactor substantially reduces the suspended matter in the feed water to the packed bed bioreactor. The head loss of the bioreactor is thus decreased having an impact on the cleaning frequency of the bioreactor.

In one preferred embodiment said upstream filtration device is a membrane filtration device, preferably an ultra filtration or micro filtration device. An advantage of this embodiment is that no additional feed pump for feeding the water into the bioreactor is required when an ultrafiltration device is located upstream of the packed bed bioreactor as the pump of the ultrafiltration device provides for a feed stream according to the requirements for the functioning of the packed bed bioreactor.

In another embodiment said upstream filtration device is a conventional filtration device. The conventional filtration device according to present invention can be any type of filter other than membranes, for example a granular media filter with inert or/and adsorbent filter media, a screen or microscreen filter, a fiber bundle type filter or a disc type filter. In combination with the packed bioreactor according to present invention conventional filtration technologies can offer a cost effective alternative for UF/MF.

The system can further comprise a reverse osmosis or nanofiltration membrane downstream of the packed bed bioreactor which is protected from biofouling by the upstream packed bed reactor in combination with a membrane filtration device according to present invention.

In another preferred embodiment the packed bed bioreactor further comprises an inlet distributor allowing even distribution of the feed water in axial direction from the top of the vessel. The inlet distributor should evenly distribute the water in axial direction preventing short circuiting of water through the media.

The packed bed bioreactor according to one embodiment of present invention comprises a closed vessel or tank, having a bottom and a top, and is able to operate during pressurized conditions.

The vessel or tank is partly filled with carrier media, consistently distributed, having a density higher or close to the water to be treated. The effluent to be treated is pumped into the top of the vessel or tank and equally distributed downwards using an inlet distributor. The inlet distributor should evenly distribute the water in axial direction preventing short circuiting of water through the media. An outlet screen consisting of a series of laterals or a screen having openings adapted to prevent the media from passing there through is positioned at the bottom of the tank. During normal operation the bioreactor is operated as a fixed bed. During regeneration the bioreactor is back flushed changing the flow direction using the existing feed water pump and switching valve positions. The media expands and is operated as a fluidized bed releasing the excess of solids that are captured or grown inside the bioreactor during normal operation.

The packed bed bioreactor according to present invention can be back flushed when the pressure drops, preferably the bioreactor shall be back flushed when the head loss is less than 0.2 bar for the total series of bioreactors.

The back flush rate has to be sufficiently high to create a fluidized bed to remove suspended solids, but to prevent a significant loss of biological activity, preferable is a loss of less than 20%. Preferably the duration of the back flush shall not exceed 120 seconds and can be performed with feed water or treated water. According to present invention aeration is not required during back flushing.

In case back flush is required to decline pressure drop and remove excess of suspended solids, free head space is needed to allow a fluidized bed. According to one embodiment of present invention the required free head space to expand the fluidized bed to flush solids is of at least 20% of the reactor volume.

In one embodiment of present invention back flushing of the bioreactor is not necessary in case the bioreactor is placed behind an UF membrane.

The goal of present invention is to minimize biological growth of micro-organisms in RO membranes. This is achieved by offering carrier surface upstream of the RO membrane. The amount of carrier surface required is dependent on the degree of nutrients/organic carbon depletion that is necessary to minimize growth at the RO membrane. One main feature that needs to be determined is how much remaining biological activity is acceptable (expressed as oxygen equivalents per unit of volume and per unit of volume over time unit) in the feed water of the RO membrane to prevent or to minimize biological growth. According to present invention the minimum ratio of total carrier surface to downstream RO membrane surface is 100%.

In another embodiment of present invention a recycle loop can be added to the packed bed bioreactor for those situations where the concentration of nutrients does not meet the defined criteria.

EXAMPLES

Example 1

Test Set-Up BiopROtector®

Figure 7:
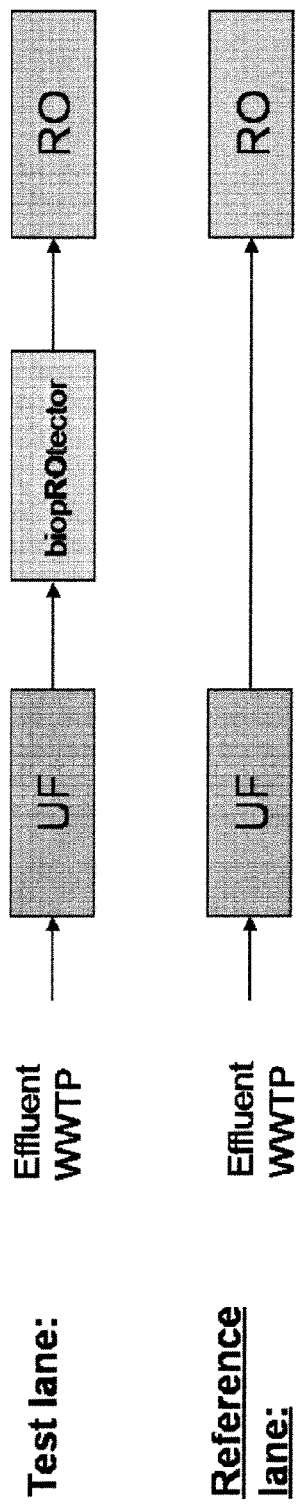
FIG. 7 shows a set-up according to which tests have been run.

To test the efficiency of the setup, tests have been run according to the setup as shown in FIG. 7.

In test setup 1 the effluent was led through an ultrafiltration step into a packed bed bioreactor according to present invention (BiopROtector®), and as a last step subjected to a reverse osmosis step.

Figure 8:
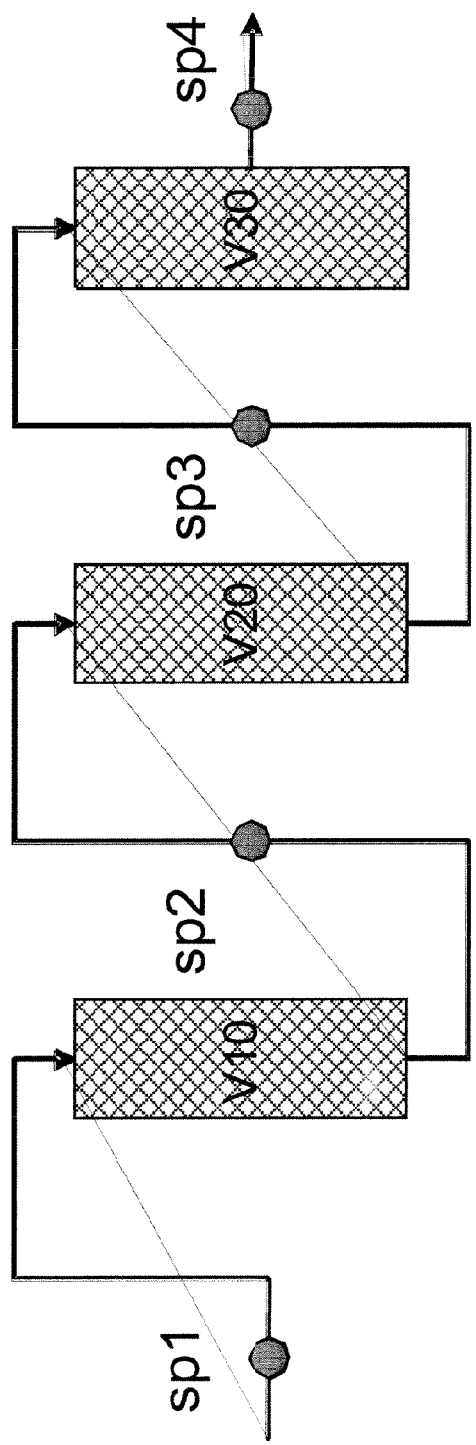
FIG. 8 shows a schematic pilot lay-out of biopROtector with three different bioreactors.

In FIG. 8 a schematic pilot lay-out biopROtector is shown. Present invention was tested in a sequence of three bioreactors, where V10 is the first bioreactor, followed by respectively V20 and V30.

Figure 9:
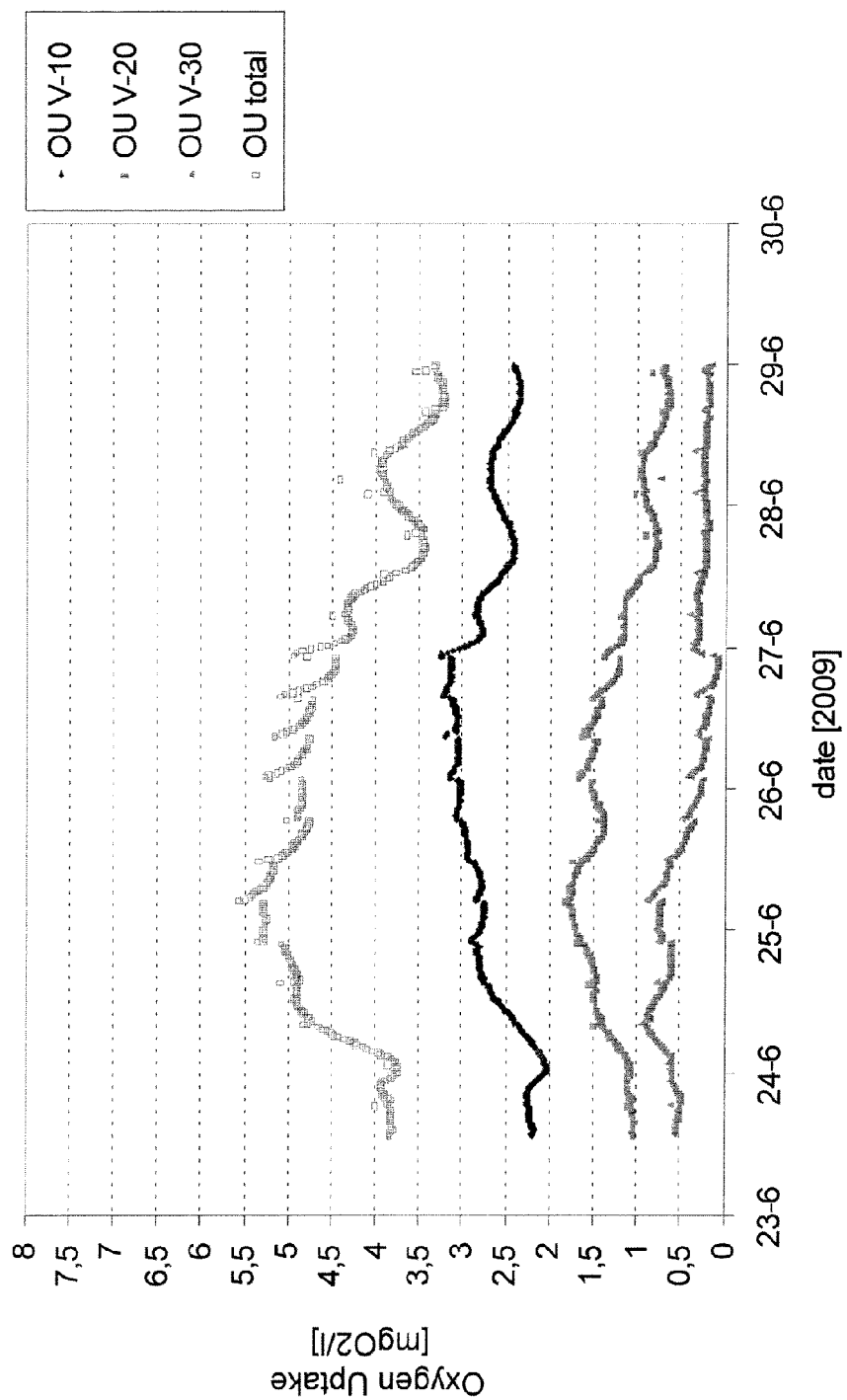
FIG. 9 shows the results of the measurements of the oxygen uptake of the three bioreactors in the set-up as shown in FIG. 8.

The oxygen uptake was measured in each bioreactor in this setup. FIG. 9 shows the oxygen uptake in time for each bioreactor. It can be seen that the highest oxygen uptake takes place in the first bioreactor V10, followed by the V20 and finally V30.

Figure 10:
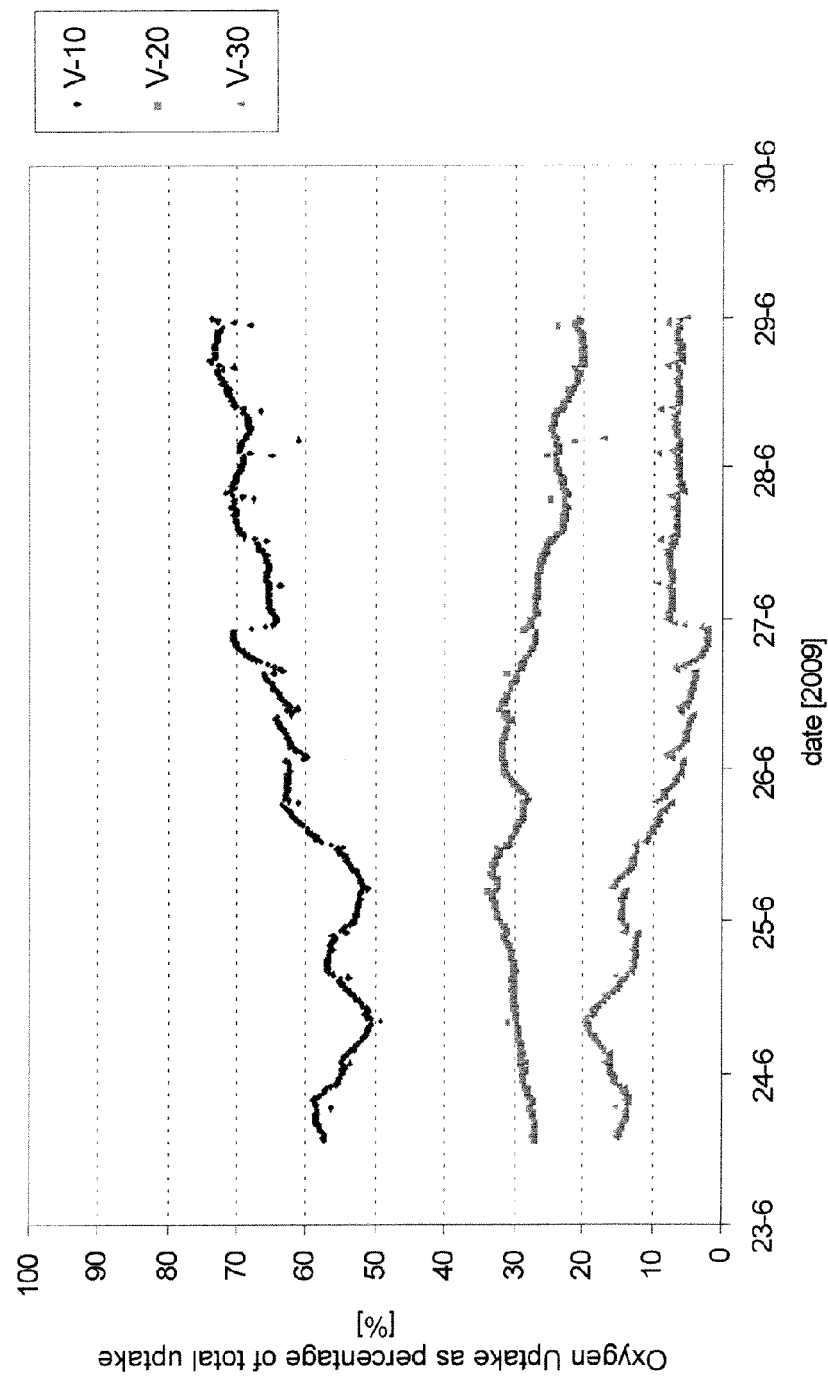
FIG. 10 shows the oxygen uptake as percentage of the total oxygen uptake of the three bioreactors in the set-up as shown in FIG. 8.

FIG. 10 shows the oxygen uptake for the different bioreactors as the percentage of total oxygen utilization measured for a period of 7 days. The first bioreactor (V10) has the highest contribution in oxygen uptake (50-75%), followed by respectively V20 (20-33%) and V30 (3-20%).

Figure 11:
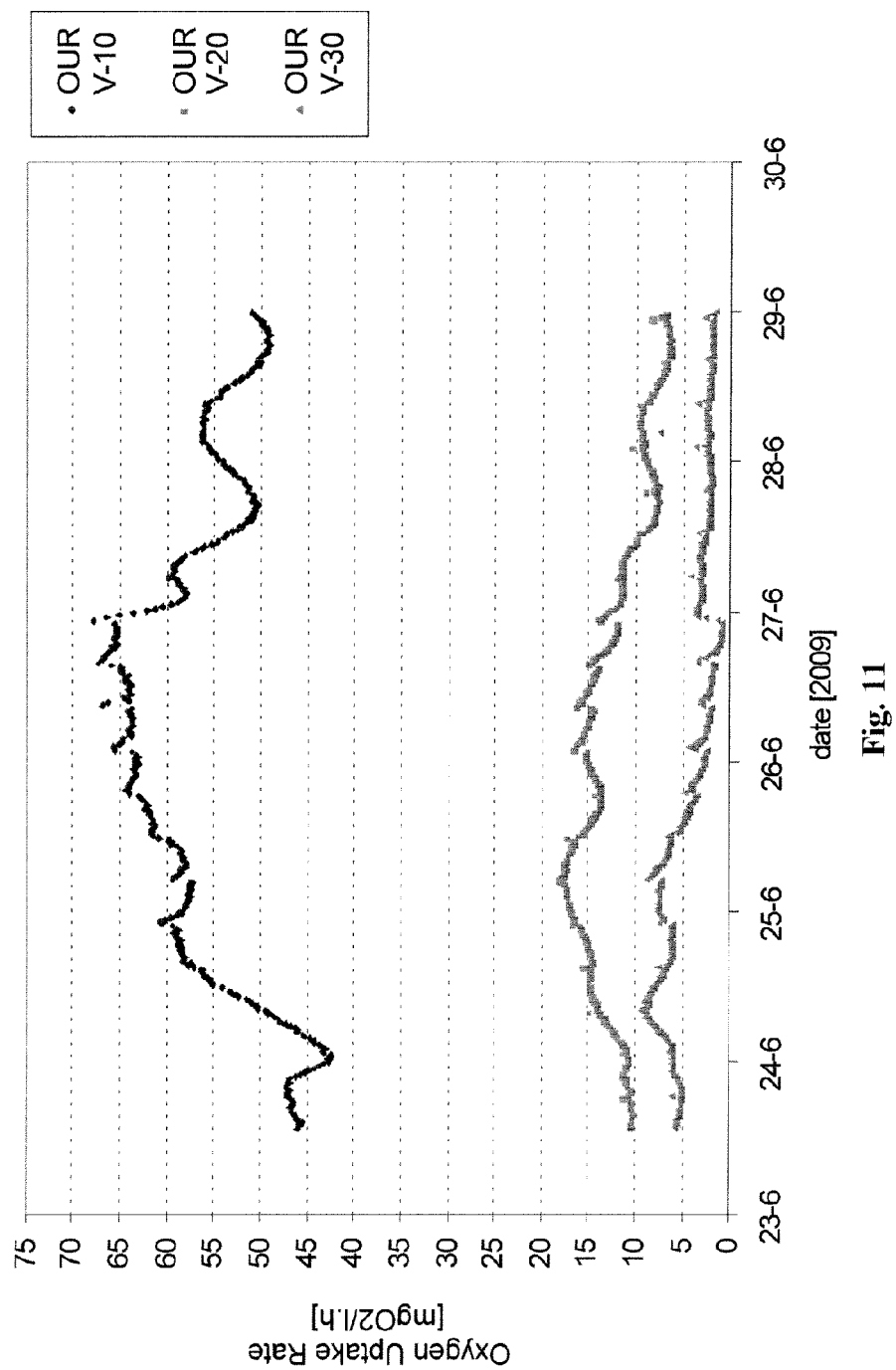
FIG. 11 shows the oxygen uptake rate for all three bioreactors in the set-up as shown in FIG. 8.

In FIG. 11 the oxygen uptake rate for all three bioreactors is shown. It can be seen that the highest oxygen uptake rate takes place in the first bioreactor (V10) followed by V20 and V30.

Figure 12:
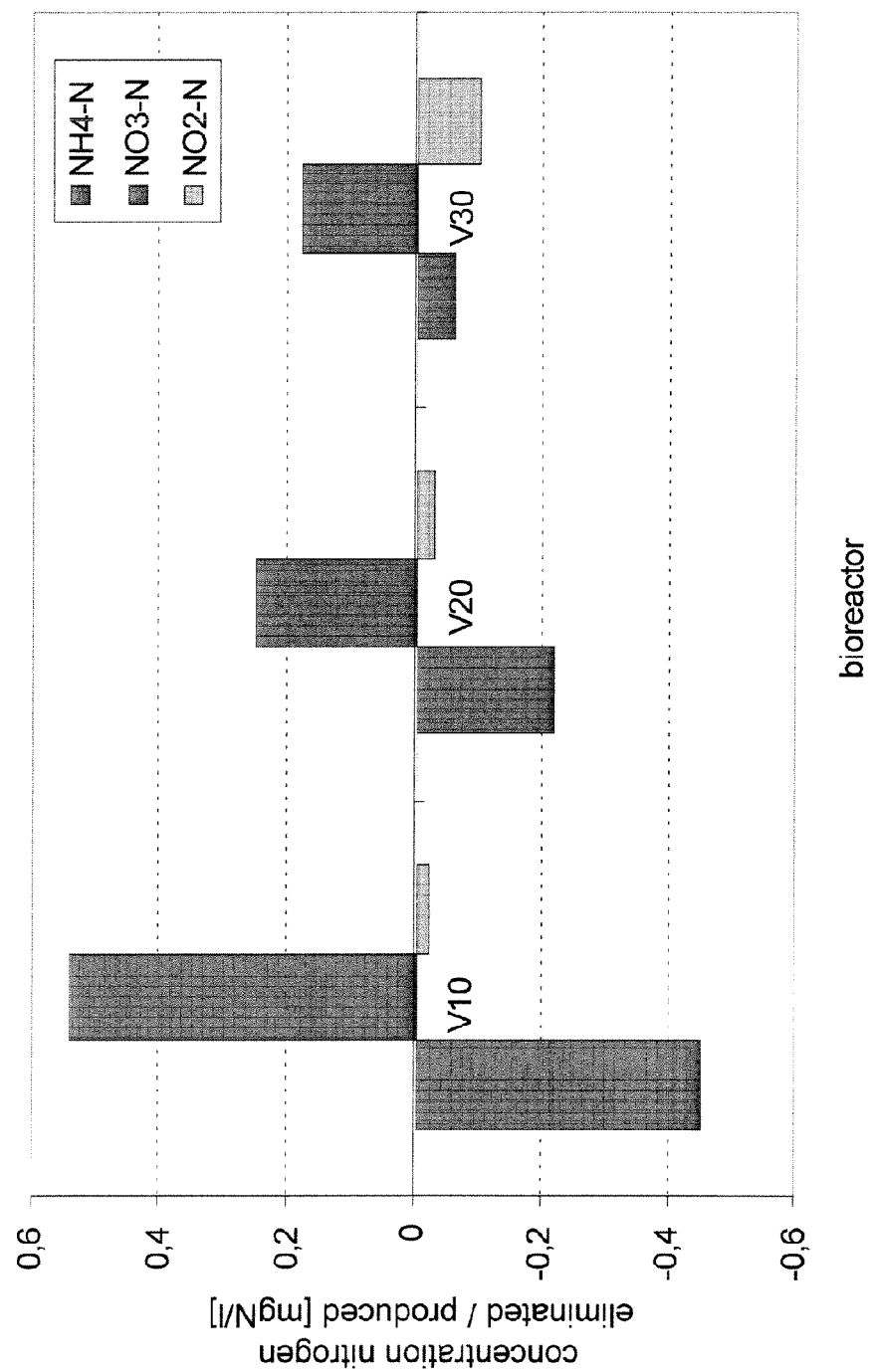
FIG. 12 shows the removal/production of several nitrogen forms.

In the same pilot lay-out biopROtector the concentration of nitrogen was measured on the 23 Jun. 2009 at sample points sp1, 2, 3 and 4 (FIG. 8). Based on the measurements a nitrogen mass balance was made for ammonia, nitrate, nitrite and organic nitrogen. FIG. 12 shows the removal/production of several nitrogen forms, with the highest removal/production of ammonia/nitrate in the first reactor and a lower removal/production of ammonia/nitrate in the second and third bioreactor. The utilization of oxygen in the bioreactor directly corresponds with bacterial growth and removal of available nutrients and carbon sources that present.

Figure 13:
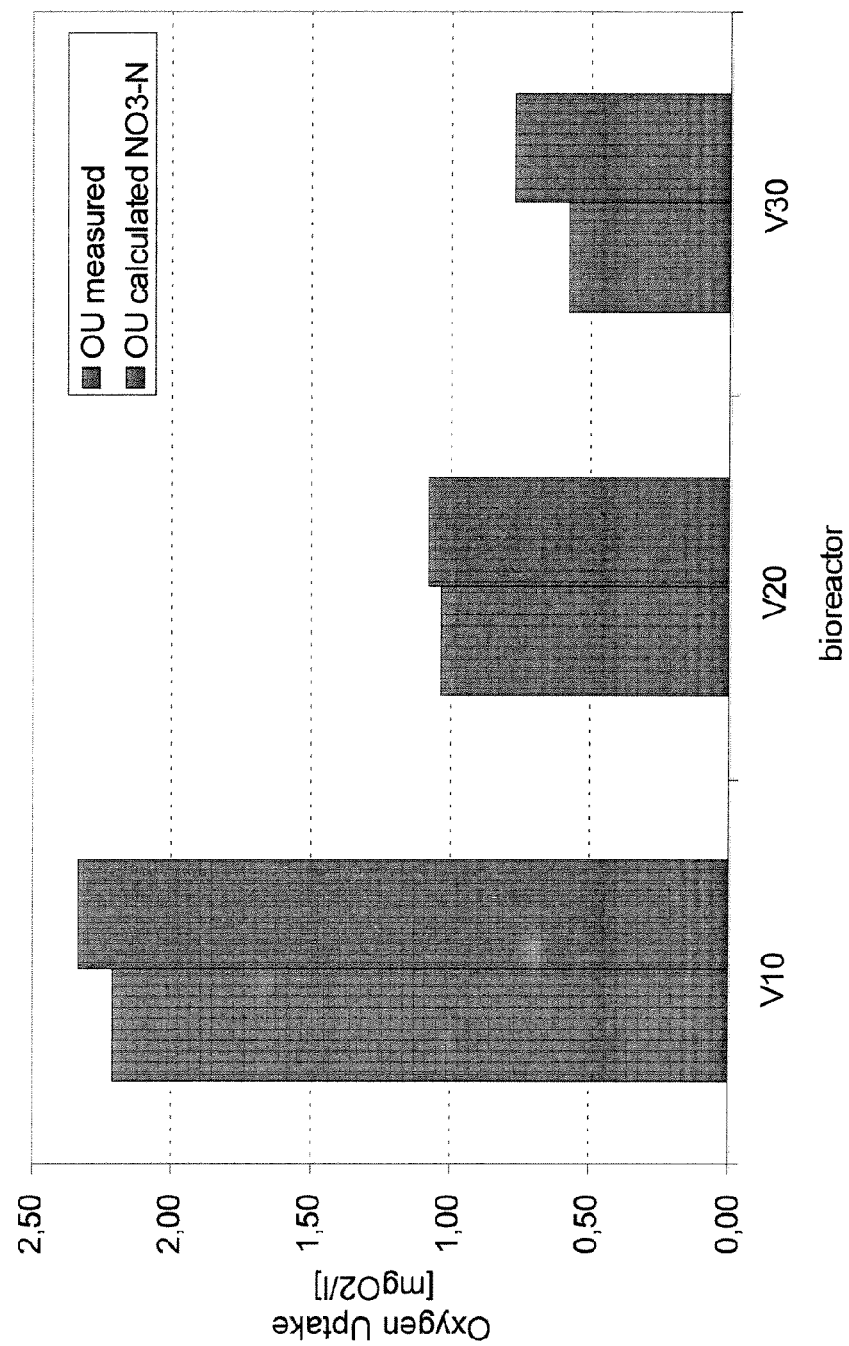
FIG. 13 shows the oxygen uptake versus the nitrate production.

FIG. 13 shows the oxygen uptake "measured" and oxygen uptake "required" based on the amount of nitrate produced for all three bioreactors using a theoretical oxygen utilization factor of 4.33 $mgO_2$ required for the production of 1 mg $NO_3$—N.

From these measurements (FIG. 9-13) it can be concluded that using a sequence of three bioreactors in series, being fed with UF effluent from a domestic wastewater treatment plant:

1. The highest oxygen uptake occurs in the first bioreactor (up to 70% of the total oxygen utilization within the HRT of three bioreactors) followed by a strong decrease in oxygen uptake in the downstream second and third bioreactor.
2. The highest oxygen uptake rate (OUR) occurs in the first bioreactor followed by a strong decrease in oxygen uptake rate in the downstream second and third bioreactor.
3. A depletion of nutrients occurs in the axial direction of the bioreactor, showing the highest removal in the first bioreactor followed by a lower removal rate of ammonia in the downstream second and third bioreactor.
4. The oxygen uptake in all three bioreactors largely corresponds with the nitrate production, saying that the measured oxygen uptake is mainly caused by oxidation of ammonia and nitrite nitrogen.
5. Depletion of nutrients in axial direction results in lower oxygen uptake and lower oxygen uptake rate and therefore a lower biofilm growth rate downstream the bioreactor.

The organic content of the water was not measured. COD, TOC and BOD measurements have no or little value due to the small difference between inlet and outlet and the reliability of the COD, TOC and BOD analysis. Therefore it is very difficult to gain reliable mass balances for COD, TOC and BOD. However because of the clear decline of ammonia nitrogen in axial direction of the bioreactor it is expected that organic compounds will show a similar diminishing concentration profile along the bioreactor.

Example 2

Non-Filtering Properties of the Bioreactor

Based on the nitrogen oxidation by autotrophic bacteria the expected growth of solids can be calculated. The following parameters were used for the calculation of the expected sludge production nitrogen oxidation in the bioreactor being fed with UF effluent from a domestic waste water plant:

| | |
|---|---|
| Average oxygen uptake bioreactor V10 (26-06-2000:28-07-2009) | 1.76 mgO2/l |
| Sludge yield autotrophic bacteria | 0.074 g cell COD/gN oxidized |
| COD content sludge | 1.42 kgCOD/kgODS (organic dry solids) |
| ash content (inorganic) | 20% |
| average N oxidated | 0.41 mgN/l |
| average sludge produced | 0.026 mg MLSS/l |
| average sludge produced | 0.11 mg MLSS/l · h |

It was calculated that the daily sludge production in bioreactor V10 is 2.64 mgMLSS/l. The accumulated sludge production due to growth only should be for a time period of 1 month approximately 1.9 gMLSS/l, as shown in FIG. 14. However, growth of heterotrophic bacteria using available carbon sources and bacterial decay processes were not taken into account. From FIG. 14 it can be seen that within the considered period there is no pressure increase over V10. This observation supports the claim that the bioreactor has neither intended nor strong filtering characteristics.

Example 3

Membrane Fouling Simulator

The present invention was tested using a Membrane Fouling Simulator (MFS) (Vrouwenvelder et al, 2006). The MFS is a practical tool for fouling prediction and control. Using the MFS, fouling can be monitored by e.g. operational parameters like pressure drop development and non-destructive (visual and microscopic) observations.

Figure 15:
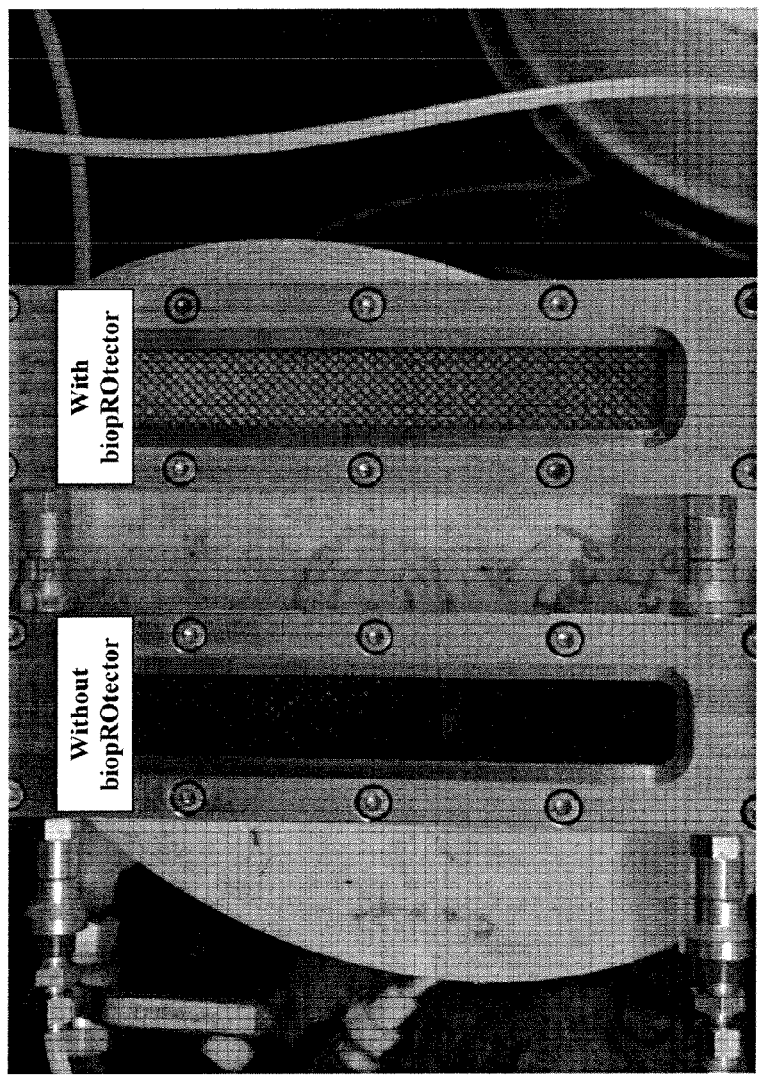
FIG. 15 shows a visual observation of the Membrane Fouling Simulator (MFS) on UF effluent of a domestic waste water treatment plant with and without preceding biopROtector using only V10.

FIG. 15 shows visual observation of the MFS on UF effluent of a domestic waste water treatment plant with and without preceding biopROtector according to FIG. 8 where for the configuration with biopROtector water was sampled at SP2 and for the configuration without, water was sampled at SP1. The photo was taken 11 days after the start of feeding the MFS with a clean RO membrane and spacers. There is a clear difference in degree of fouling after 11 days of operation visible.

Figure 16:
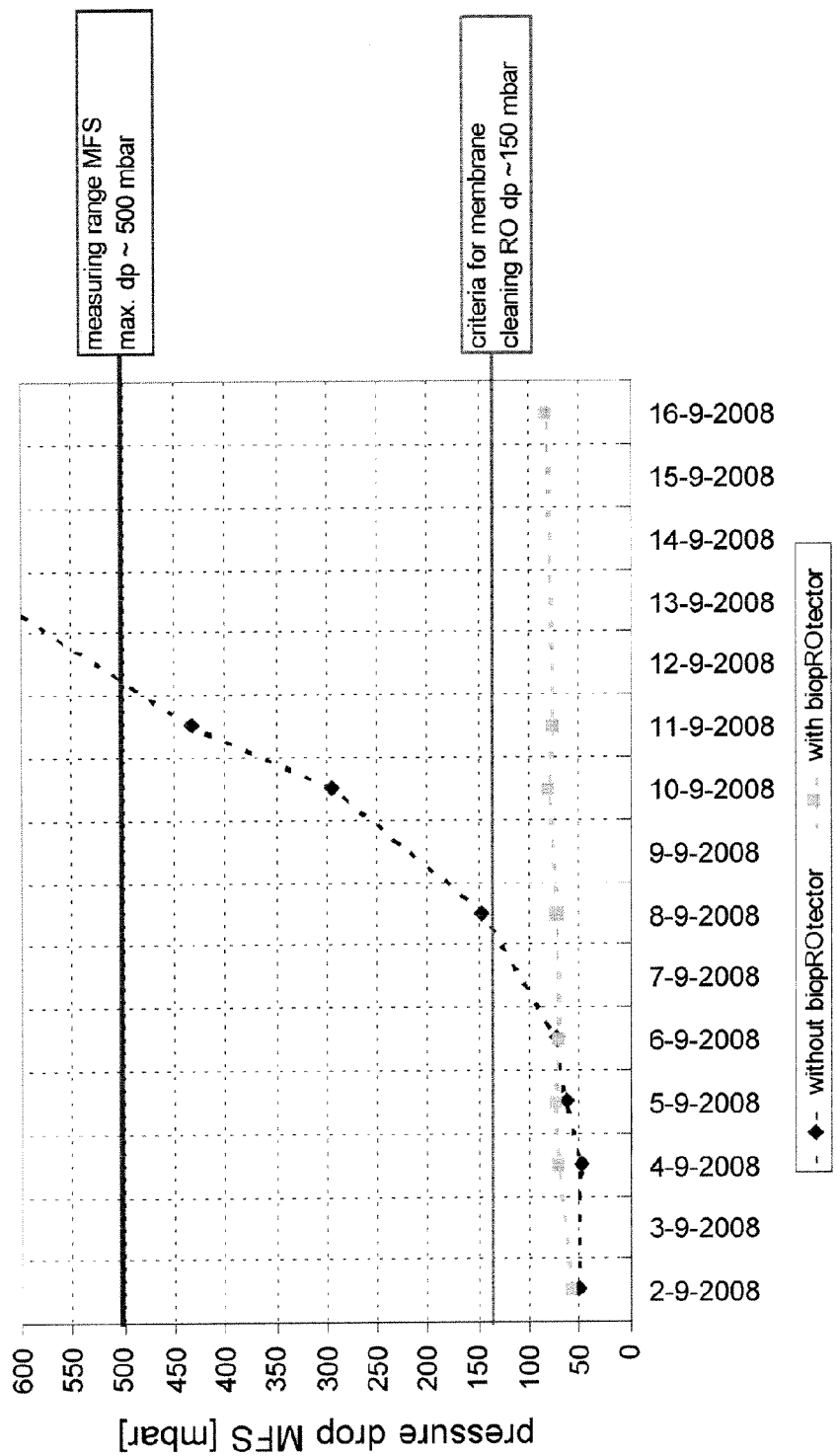
FIG. 16 shows the pressure drop development of both Membrane Fouling Simulators (MFS) as shown in FIG. 15.

The visual observations were supported by the pressure drop developments of both MFS as given in FIG. 16. The pressure drop increase as observed for the MFS without preceding biopROtector is directly a consequence of biological growth because the UF permeate feed water is free of any suspended solids. Furthermore the exponential increase is typical for biological growth at non-limiting conditions (presence of nutrients, carbon sources and sufficient oxygen).

The invention claimed is:

1. A method of treating a waste stream with a reverse osmosis or nanofiltration membrane unit and removing biodegradable compounds from the waste stream at a point upstream of the reverse osmosis or nanofiltration membrane unit to prevent biofouling of the reverse osmosis or nanofiltration membrane unit, the method comprising:
    upstream of the reverse osmosis or nanofiltration membrane unit, directing the waste stream into a bioreactor filled with packing elements, that support a biofilm, having a void fraction of at least 70% and wherein the packing elements within the bioreactor have a specific surface area of at least 750 $m^2/m^3$ and wherein the packing elements within the bioreactor are effective to remove biodegradable compounds from the wastewater passing through the bioreactor;
    biologically treating the waste stream by directing the waste stream through the bioreactor;

limiting the removal efficiency of suspended solids to 30% or less in the bioreactor by maintaining the velocity of the waste stream passing the packing elements to a velocity of at least 20 m/h;

wherein the method of treating the waste stream is accomplished in the absence of any biocide or biostatic compound; and after directing the waste stream through the bioreactor, directing the waste stream to the reverse osmosis or nanofiltration membrane unit and wherein the reverse osmosis or nanofiltration membrane unit removes dissolved solids from the waste stream.

2. The method of claim 1 wherein the packing elements have a protective surface area of at least 350 m²/m³.

3. The method of claim 1 further including filtering the waste stream and removing suspended solids therefrom.

4. The method of claim 3 wherein filtering the waste stream occurs upstream of the bioreactor or between the bioreactor and the reverse osmosis or nanofiltration membrane unit.

5. The method of claim 4 including utilizing an ultrafiltration or microfiltration membrane upstream of the bioreactor to filter the waste stream and remove suspended solids therefrom.

6. The method of claim 1 wherein the treatment of the waste stream in the bioreactor is carried out in the absence of aeration.

7. The method of claim 1 including limiting the removal efficiency of suspended solids in the bioreactor to 30% or less by controlling the velocity of the waste stream passing through the bioreactor such that the velocity of the waste stream is approximately 20 m/h to approximately 400 m/h.

8. The method of claim 1 wherein the packing elements are made of metal, ceramic or plastic.

9. The method of claim 8 wherein the packing elements are made of polyethylene.

10. The method of claim 1 wherein there is an absence of aeration in the bioreactor and dissolved oxygen is supplied to the bioreactor via the waste stream and the method includes providing a sufficient dissolved oxygen concentration to biodegrade nutrients in the waste stream.

11. The method of claim 1 including positioning a filtration device downstream of the bioreactor to filter detached biomass that has become detached from a biofilm disposed on the packing elements.

12. The method of claim 1 including providing a filtration step upstream of the bioreactor so as to remove suspended solids from the waste stream and thereby prevent a substantial increase in head loss of the bioreactor due to suspended solids being retained in the bioreactor.

13. The method of claim 1 wherein the bioreactor is operated as a fixed bed.

14. The method of claim 1 including a regeneration process where the bioreactor is back flushed and the packing elements expand to form a fluidized bed and release excess solids that are captured or grown inside the bioreactor during a normal operation.

15. The method of claim 1 including three bioreactors in series and the method includes directing the waste stream through each of the bioreactors where each bioreactor includes an array of packing elements in the form of biofilm carriers.

16. The method of claim 1 wherein the waste stream comprises water and wherein during a normal operation, the bioreactor is operated as a fixed bed and during regeneration, the reactor is backflushed and the packing elements expand and the bioreactor is operated as a fluidized bed releasing excess solids that are captured or grown inside the bioreactor during normal operation.

17. The method of claim 1 wherein the waste stream is a tertiary wastewater stream and wherein during a normal operation, the bioreactor is operated as a fixed bed and during regeneration, the reactor is backflushed and the packing elements expand and the bioreactor is operated as a fluidized bed releasing excess solids that are captured or grown inside the bioreactor during normal operation.

* * * * *